(12) United States Patent
Harayama (10) Patent No.: US 10,421,235 B2
(45) Date of Patent: Sep. 24, 2019

(54) THREE-DIMENSIONAL OBJECT, METHOD FOR PRODUCING THREE-DIMENSIONAL OBJECT, AND THREE-DIMENSIONAL OBJECT PRODUCTION APPARATUS

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 15/788,309

(22) Filed: Oct. 19, 2017

(65) Prior Publication Data

US 2018/0111323 A1    Apr. 26, 2018

(30) Foreign Application Priority Data

Oct. 21, 2016   (JP) .................................. 2016-207113

(51) Int. Cl.
| | |
|---|---|
| *B29C 64/393* | (2017.01) |
| *B05D 1/26* | (2006.01) |
| *B05D 5/06* | (2006.01) |
| *B41J 2/045* | (2006.01) |
| *B33Y 50/02* | (2015.01) |
| *G05B 19/4099* | (2006.01) |
| *B29C 64/112* | (2017.01) |
| *B33Y 10/00* | (2015.01) |
| *B33Y 30/00* | (2015.01) |
| *B33Y 80/00* | (2015.01) |

(52) U.S. Cl.
CPC .............. *B29C 64/393* (2017.08); *B05D 1/26* (2013.01); *B05D 5/06* (2013.01); *B29C 64/112* (2017.08); *B33Y 50/02* (2014.12); *B41J 2/0456* (2013.01); *G05B 19/4099* (2013.01); *B29K 2995/002* (2013.01); *B33Y 10/00* (2014.12); *B33Y 30/00* (2014.12); *B33Y 80/00* (2014.12); *G05B 2219/35134* (2013.01); *G05B 2219/49007* (2013.01); *Y10T 428/24628* (2015.01)

(58) Field of Classification Search
CPC ... B33Y 10/00; B05D 1/26; B05D 5/06; B41J 2/0456; Y10T 428/24628
See application file for complete search history.

(56) References Cited

U.S. PATENT DOCUMENTS

2015/0273520 A1* 10/2015 Okamoto ............... B41J 2/0456
                                                                428/172

* cited by examiner

*Primary Examiner* — Betelhem Shewareged
(74) *Attorney, Agent, or Firm* — Rankin, Hill & Clark LLP

(57) ABSTRACT

A three-dimensional object is made of curable ink and includes a color layer serving as an outer surface. The color layer includes color ink and clear ink filling a space between dots of the color ink. A rate of the color ink to the clear ink decreases toward an outer side. With this configuration, the clear ink ensures diffusion of light beams reflected by dots of the color ink in a portion close to the outer side of the color layer. This ensures improved granular texture on the surface of the three-dimensional object.

20 Claims, 11 Drawing Sheets

THREE-DIMENSIONAL OBJECT, METHOD FOR PRODUCING THREE-DIMENSIONAL OBJECT, AND THREE-DIMENSIONAL OBJECT PRODUCTION APPARATUS

CROSS-REFERENCE TO RELATED APPLICATIONS

The present application claims priority under 35 U.S.C. § 119 to Japanese Patent Application No. 2016-207113, filed Oct. 21, 2016. The contents of this application are incorporated herein by reference in their entirety.

BACKGROUND OF THE INVENTION

Field of the Invention

The present disclosure relates to a three-dimensional object, a method for producing the three-dimensional object, and a three-dimensional object production apparatus.

Discussion of the Background

U.S. Pat. No. 9,020,627 discloses a known method for producing a three-dimensional object. This method, performed by a 3D printer utilizing an ink-jet method, includes ejecting ultraviolet curable resin and building up a pattern of layers of the resin. Specifically, the method for producing a three-dimensional object includes: obtaining data on outer/inner design, mechanism, and the like of a final product with three-dimensional computer-aided design (CAD); slicing the data to generate multilayered pattern data, representing a form obtained by depositing thin layers, with a computer; and depositing layers of ultraviolet curable resin ejected from a head based on the pattern data. It is a common practice to decorate (with graphics and colors) the three-dimensional object produced with such a method.

The contents of U.S. Pat. No. 9,020,627 are incorporated herein by reference in their entirety.

A decorated three-dimensional object may be produced as follows. Specifically, the three-dimensional object may be produced with decorative ink (for example, ink of colors such as yellow, magenta, cyan, and black) ejected in the ink-jet method. In this context, there has been a demand for achieving smooth coloring of a surface of an object with dots of ejected decorative ink being less noticeable.

The present disclosure has been made in view of the above-described circumstances, and it is an object of the present disclosure to provide a three-dimensional object having a smoothly colored surface, a method for producing the three-dimensional object, and a three-dimensional object production apparatus.

SUMMARY

According to one aspect of the present disclosure, a three-dimensional object is made of curable ink and includes a color layer serving as an outer surface. The color layer includes color ink and clear ink filling a space between dots of the color ink. A rate of the color ink to the clear ink decreases toward an outer side. With this configuration, the clear ink ensures diffusion of light beams reflected by dots of the color ink in a portion close to the outer side of the color layer. This ensures improved granular texture on the surface of the three-dimensional object.

The three-dimensional object according to the present disclosure may further include a reflective layer that reflects light, the reflective layer being provided more on an inner side than the color layer. This configuration ensures that the color of the color layer is not mixed with the color of an undelaying model material, and thus enables a desired color to be faithfully provided.

In the three-dimensional object according to the present disclosure, the color layer may be formed with a size of the dots of the color ink decreasing toward the outer side. This configuration enables the rate of the color ink to the clear ink to be decreased.

In the three-dimensional object according to the present disclosure, the color layer may include a plurality of layers, and the size of the dots of the color ink may be uniform in each of the layers. This configuration enables the size of the dots of the color ink to be set for each layer.

In the three-dimensional object according to the present disclosure, the color layer may be formed with a density of the dots of the color ink decreasing toward the outer side. This configuration enables the rate of the color ink to the clear ink to be decreased.

In the three-dimensional object according to the present disclosure, the color layer may include a plurality of layers, and the density of the dots of the color ink may be uniform in each of the layers. This configuration enables the density of the dots of the color ink to be set for each of the layers.

In the three-dimensional object according to the present disclosure, a layer made of clear ink may be provided between the plurality of layers of the color layer. This configuration ensures diffusion of light beams from the color layer provided more on the inner side than the layer made of clear ink, and thus ensures improved granular texture.

In the three-dimensional object according to the present disclosure, the color layer may include a plurality of layers with layers made of clear ink each provided between adjacent ones of the plurality of layers, and the layers made of the clear ink may be provided in such a manner that a layer on the outer side has a larger thicker than a layer on the inner side. The layers made of clear ink ensures that the rate of the color ink decreases toward the outer side even when the layers of the color layer have the uniform configuration.

In the three-dimensional object according to the present disclosure, the color layer may include a layer made of clear ink serving as an outermost surface. The clear ink layer, serving as the outermost layer, ensures diffusion of light beams from the color ink in the color layer, and thus ensures improved granular texture.

According to yet another aspect of the present disclosure, a method for producing a three-dimensional object through additive manufacturing using curable ink includes forming a color layer having a certain thickness at a portion more on an inner side than a surface of the three-dimensional object, based on three-dimensional data on the three-dimensional object, generating a sliced image serving as design data on each layer by slicing the three-dimensional data on the three-dimensional object based on a deposition size of the curable ink, setting an amount of color ink forming the color layer, in the sliced image, in such a manner that a rate of the color ink to clear ink decreases toward an outer side, and depositing a layer of the curable ink based on data on the sliced image.

This method enables the color layer to be designed to have the rate of the color ink to the clear ink decreasing toward the outer side based on the three-dimensional data on the three-dimensional object, and the color layer to be generated based on such design data. With this configuration, the clear ink ensures diffusion of light beams reflected by dots of the color ink in a portion close to the outer side of the color layer. This ensures improved granular texture on the surface of the three-dimensional object.

In the method for producing a three-dimensional object according to the present disclosure, the depositing may include adjusting a size of dots of the color ink in accordance with the amount of the color ink forming the color layer. This configuration enables the rate of the color ink to the clear ink to be decreased.

In the method for producing a three-dimensional object according to the present disclosure, the depositing may include adjusting a density of dots of the color ink in accordance with the amount of the color ink forming the color layer. This configuration enables the rate of the color ink to the clear ink to be decreased.

According to yet another aspect of the present disclosure, a three-dimensional object production apparatus forms a three-dimensional object through additive manufacturing using curable ink and includes an inputter configured to receive three-dimensional data on the three-dimensional object, a design data generation unit configured to generate design data on each layer, based on the three-dimensional data received by the inputter, and a depositing unit configured to deposit layers based on the design data. The design data generation unit is configured to execute forming a color layer having a certain thickness at a portion more on an inner side than a surface of the three-dimensional object, based on the three-dimensional data on the three-dimensional object, generating a sliced image serving as design data on each layer by slicing the three-dimensional data on the three-dimensional object based on a deposition size of the curable ink, and setting an amount of color ink forming the color layer, in the sliced image, in such a manner that a rate of the color ink to clear ink decreases toward an outer side.

This method enables the color layer to be designed to have the rate of the color ink to the clear ink decreasing toward the outer side based on the three-dimensional data on the three-dimensional object, and the color layer to be generated based on such design data. The clear ink ensures diffusion of light beams reflected by dots of the color ink in a portion close to the outer side of the color layer. This ensures improved granular texture on the surface of the three-dimensional object.

In the three-dimensional object production apparatus according to the present disclosure, the depositing unit may be configured to adjust a size of dots of the color ink in accordance with the amount of the color ink forming the color layer. This configuration enables the rate of the color ink to the clear ink to be decreased.

In the three-dimensional object production apparatus according to the present disclosure, the depositing unit may be configured to adjust a density of dots of the color ink in accordance with the amount of the color ink forming the color layer. This configuration enables the rate of the color ink to the clear ink to be decreased.

In the three-dimensional object according to the present disclosure, the clear ink ensures diffusion of light beams reflected by dots of the color ink in a portion close to the outer side of the color layer. This ensures improved granular texture on the surface of the three-dimensional object.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
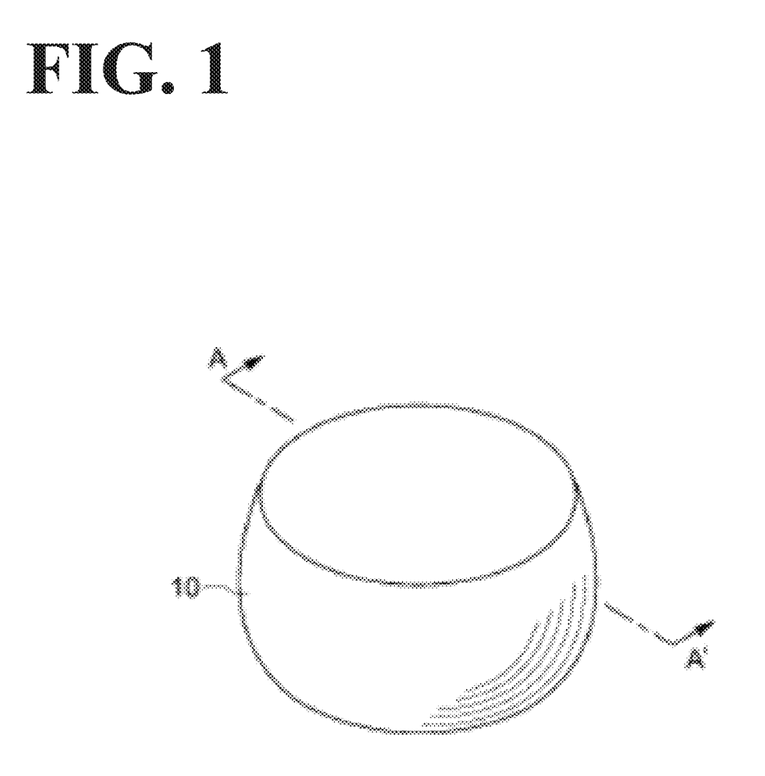
FIG. 1 is a diagram illustrating a three-dimensional object according to a first embodiment.

A three-dimensional object, a method for producing a three-dimensional object, and a three-dimensional object production apparatus according to embodiments of the present disclosure will be described below by referring to the accompanying drawings.
Configuration of Three-Dimensional Object First Embodiment FIG. 1 is a perspective outer view of a three-dimensional object 10 according to the present embodiment. The three-dimensional object 10 according to the present embodiment has a barrel-like shape with a curved and bulged side surface. The three-dimensional object 10 has a colored surface. The shape of the three-dimensional object according to the present disclosure and the shape of a three-dimensional object produced by a method according to the present disclosure are not limited to the shape illustrated in FIG. 1. For example, the embodiments of the present disclosure can be applied to any shape including a hexahedron, a sphere, a hollow structure, an annular structure, and a horseshoe shape.

Figure 2:
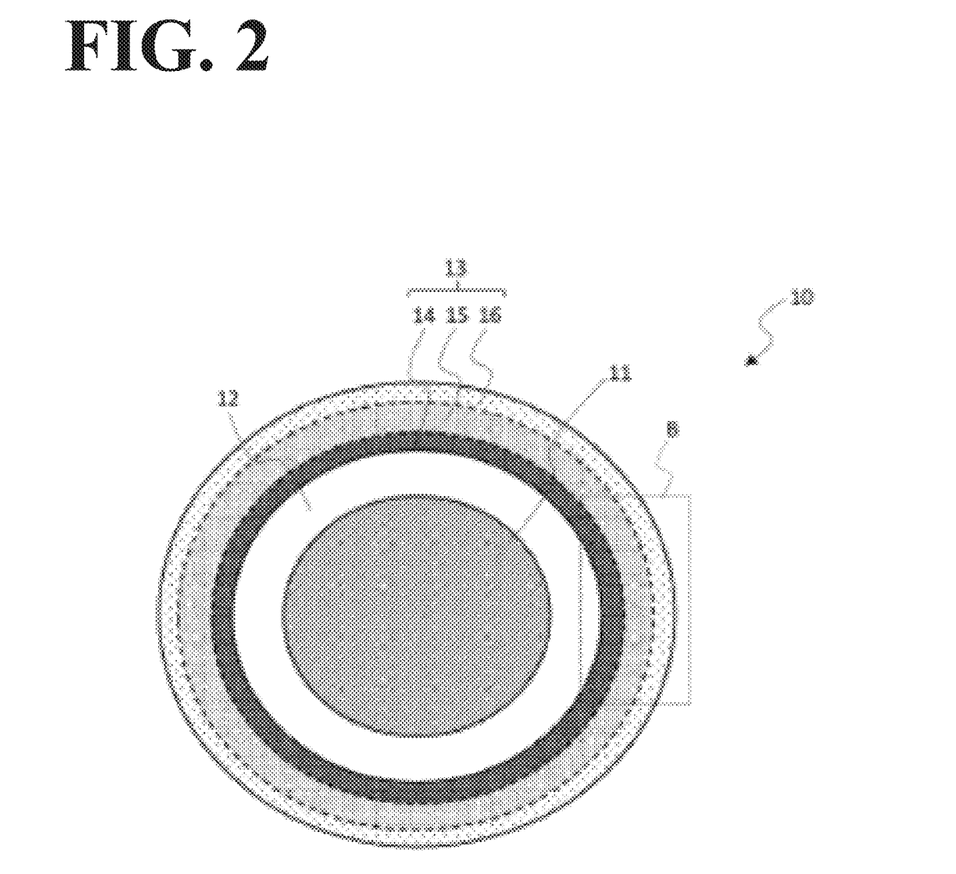
FIG. 2 is a cross-sectional view of the three-dimensional object according to the first embodiment.

FIG. 2 is a cross-sectional view of the three-dimensional object 10 taken along the line A-A' in FIG. 1. The three-dimensional object 10 includes a model material 11, a reflective layer 12, and a color layer 13 that are arrange in this order from the inner side. In the example illustrated in FIG. 2, the color layer 13 serves as the outermost surface. Thus, the color layer 13 serves as an externally visible portion of the three-dimensional object 10. The reflective layer 12 immediately on the inner side of the color layer 13 is a white layer. The reflective layer 12 is not an essential structure. Still, the white reflective layer 12 is preferably provided because the color of the model material 11 might be externally visible if the color layer 13 is formed directly over the model material 11.

The color layer 13 of the three-dimensional object 10 according to the present embodiment includes three layers that are referred to as a first layer 14, a second layer 15, and a third layer 16 in this order from the inner side for the sake of description.

Figure 3A:
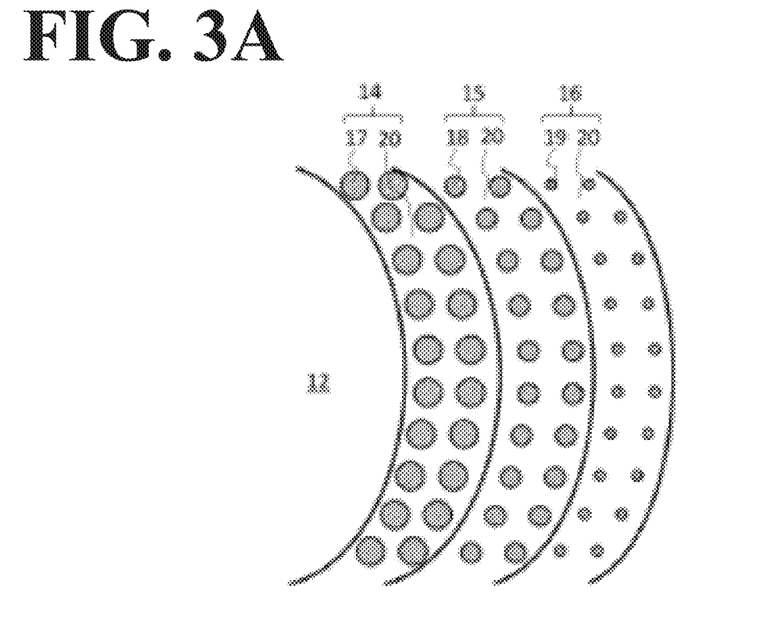
FIG. 3A is a partial cross-sectional view of the three-dimensional object according to the first embodiment.

FIG. 3A is a partially enlarged view of a section B in the cross-sectional view in FIG. 2. As illustrated in FIG. 3A, the first layer 14 includes a plurality of dots 17 of color ink, the second layer 15 includes a plurality of dots 18 of color ink, and the third layer 16 includes a plurality of dots 19 of color ink. Clear ink 20 fills between the dots 17 to 19 of color ink. The color ink and clear ink are each ultraviolet curable ink, and are cured by being irradiated with ultraviolet light after hitting a surface.

The dots 17 to 19 of color ink have the following relationship in terms of size. Specifically, the dots 17 of color ink in the first layer 14 have the largest size, the dots 18 of color ink in the second layer 15 have the second smallest size, and the dots 19 of color ink in the third layer 16 have the smallest size. Thus, the size of the dots of color ink decreases in layer-by-layer basis toward the outer side. The dots of color ink in each of the first layer 14 to the third layer 16 have a uniform size.

In the present embodiment, the density of the dots of color ink is uniform across the first layer 14 to the third layer 16. Thus, the rate of the color ink is reduced by controlling the amount of color ink hitting each position, instead of controlling the dot density. In this configuration with the size of the dots of color ink (17 to 19) decreasing toward the outer side, a portion more on the outer side has a smaller rate of the color ink and a larger rate of the clear ink.

Thus, the three-dimensional object 10 according to the present embodiment has a configuration with the rate of the clear ink increasing toward the outer side. This ensures diffusion of a light beam reflected by the dots 19 of color ink at a portion close to the outer side of the color layer 13. This diffusion of light due to the clear ink 20 at a portion close to the outer side, where the dots are more likely to be visible, ensures improved granular texture on the surface of the three-dimensional object 10.

This configuration, featuring a larger rate of the clear ink 20 on the outer side of the color layer 13 and a larger rate of the color ink on the inner side of the color ink 13, ensures that of color loss is less likely to occur when the surface of the three-dimensional object 10 is scraped.

Figure 3B:
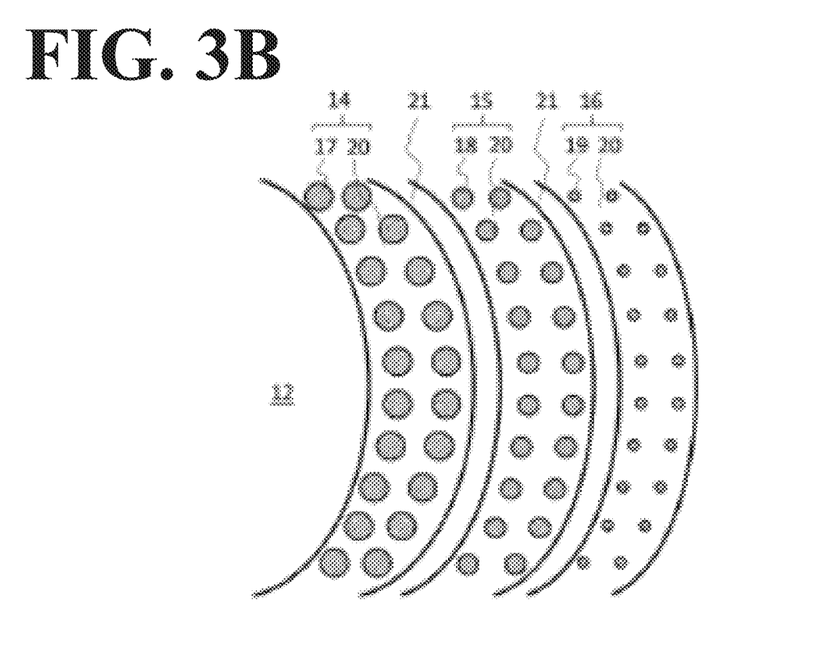
FIG. 3B is a partial cross-sectional view of a three-dimensional object according to a modification of the first embodiment.

FIG. 3B is a cross-sectional view illustrating a configuration of the three-dimensional object 10 according to a modification of the first embodiment. This three-dimensional object 10 according to the modification of the first embodiment includes layers 21, made of the clear ink, provided between the first layer 14 and the second layer 15 and between the second layer 15 and the third layer 16. The clear ink layer 21 provided between the second layer 15 and the third layer 16 renders the dots 18 of color ink, in the second layer 15, less visible and thus ensures improved granular texture. The other clear ink layer 21 has a similar effect on the first layer 14 with the dots of the largest size, to ensure improved granular texture.

Second Embodiment

Next, a three-dimensional object 10 according to a second embodiment of the present disclosure is described. The three-dimensional object 10 according to the second embodiment has the same basic configuration as the three-dimensional object 10 according to the first embodiment (see FIG. 1 and FIG. 2), but is different from the configuration in the first embodiment in how the rate of the color ink decreases toward the outer side of a color layer 13.

Figure 4A:
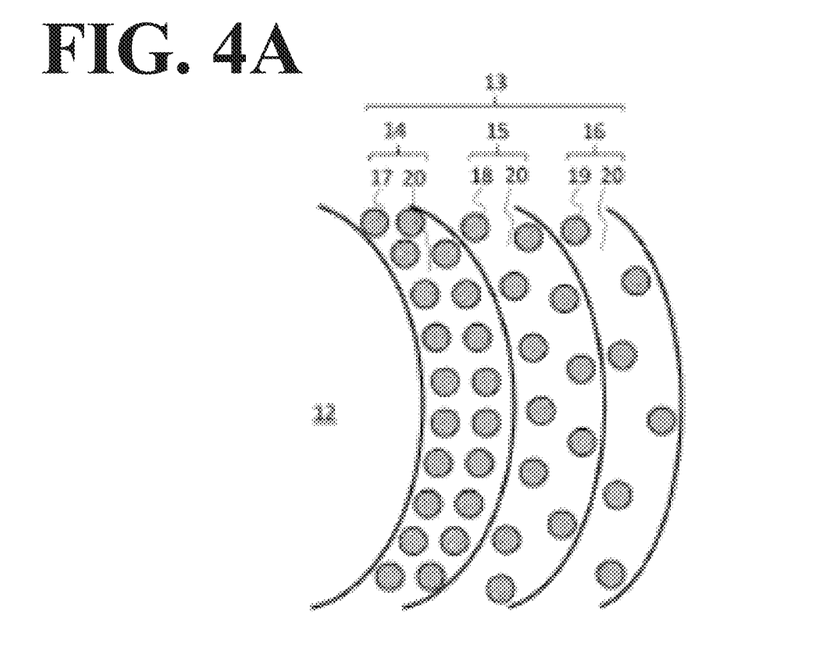
FIG. 4A is a partial cross-sectional view of a three-dimensional object according to a second embodiment.

FIG. 4A is a partial cross-sectional view of the three-dimensional object 10 according to the second embodiment. As illustrated in FIG. 4A, the three-dimensional object 10 according to the second embodiment includes the color layer 13 including a first layer 14 to a third layer 16 respectively including a plurality of dots 17 to 19 of color ink. Clear ink 20 fills the space between the dots of color ink. The dots 17 to 19 of color ink, respectively in the first layer 14 to the third layer 16, have the same size. The density of the dots 17 of color ink in the first layer 14 is the highest, the density of the dots 18 of color ink in the second layer 15 is the second highest, and the density of the dots 19 of color ink in the third layer 16 is the lowest. Thus, the density of the dots of color ink decreases toward the outer side. The first layer 14 to the third layer 16 each have a uniform density of the dots of color ink.

Figure 5A:
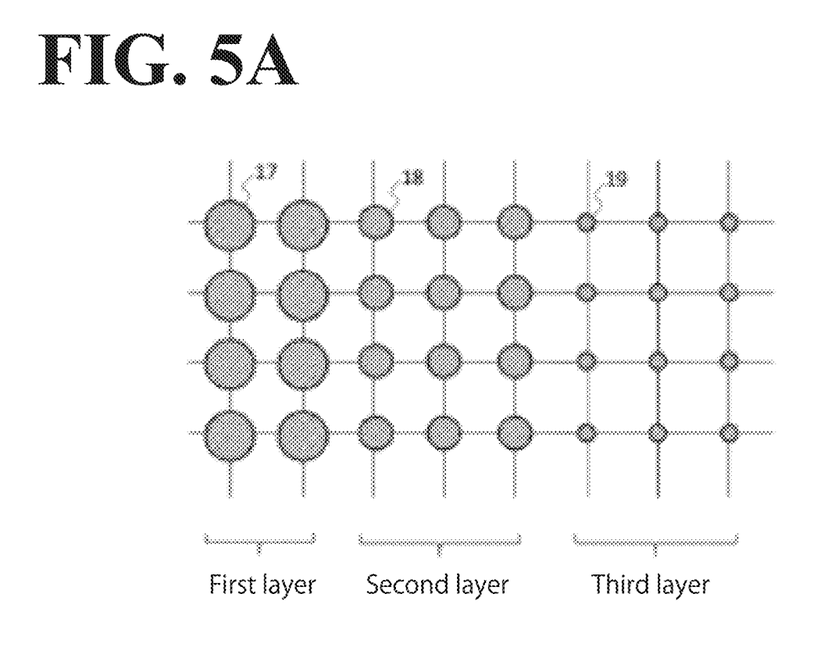
FIG. 5A is a diagram illustrating dots of color ink of the three-dimensional object according to the first embodiment.
Figure 5B:
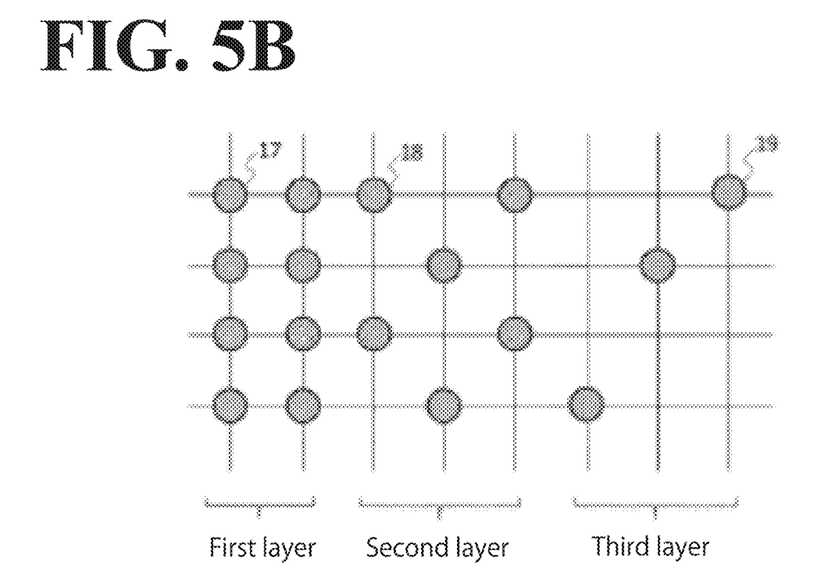
FIG. 5B is a diagram illustrating dots of color ink of the three-dimensional object according to the second embodiment.

The difference between the dots 17 to 19 of color ink in the three-dimensional object 10 according to the second embodiment and those according to the first embodiment is described. FIG. 5A is a diagram illustrating the dots 17 to 19 of color ink of the three-dimensional object 10 according to the first embodiment, and FIG. 5B is a diagram illustrating the dots 17 to 19 of color ink of the three-dimensional object 10 according to the second embodiment. As illustrated in FIG. 5A, in the first embodiment, the first layer 14 to third layer 16 have the same density of the dots of color ink, but is different from each other in the size of the dots. In the second embodiment, the first layer 14 to third layer 16 have the dots of the same size, but is different from each other in the density of the dots. Thus, in the second embodiment, the color layer 13 has the number of dots of color ink decreasing toward the outer side.

With the configuration where the density of the dots of color ink decreases toward the outer side, the rate of the color ink decreases and the rate of the clear ink 20 increases toward the outer side. This ensures improved granular texture on the surface of the three-dimensional object 10, as in the three-dimensional object 10 according to the first embodiment.

This configuration, featuring the rate of the color ink decreasing and the rate of the clear ink 20 increasing toward the outer side in the color layer 13, also ensures that color loss is less likely to occur when the surface of the three-dimensional object 10 is scraped.

Figure 4B:
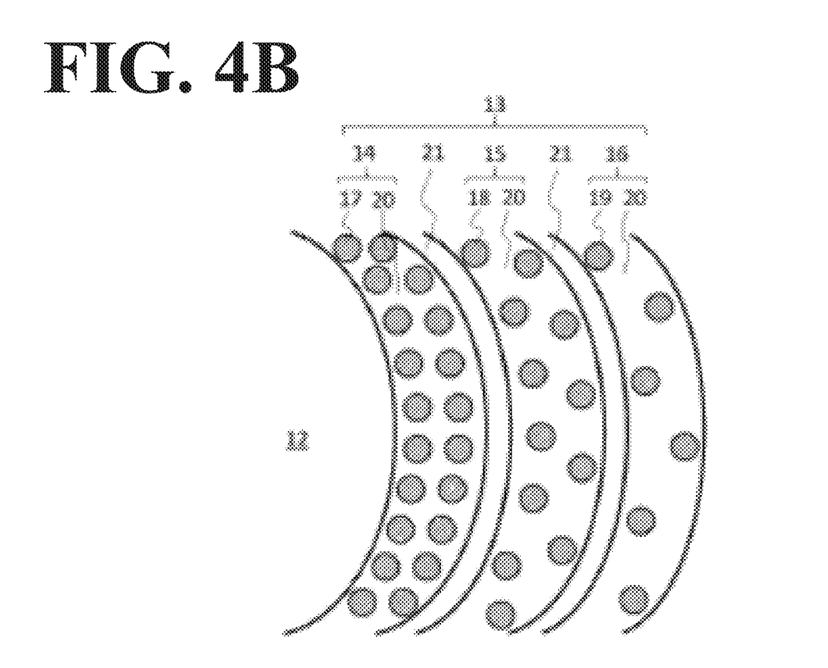
FIG. 4B is a partial cross-sectional view of a three-dimensional object according to a modification of the second embodiment.

FIG. 4B is a cross-sectional view illustrating a configuration of a three-dimensional object 10 according to a modification of the second embodiment. This three-dimensional object 10 according to the modification of the second embodiment includes layers 21, made of the clear ink, provided between the first layer 14 and the second layer 15 and between the second layer 15 and the third layer 16. The clear ink layer 21 provided between the second layer 15 and the third layer 16 renders the dots 18 of color ink, in the second layer 15, less visible and thus ensures improved granular texture. The other clear ink layer 21 has a similar effect on the first layer 14 with the highest density of the dot, to ensure improved granular texture.

Third Embodiment

Next, a three-dimensional object 10 according to a third embodiment of the present disclosure is described. The three-dimensional object 10 according to the third embodiment has the same basic configuration as the three-dimensional object 10 according to the first embodiment (see FIG. 1 and FIG. 2), but is different from the configuration in the first embodiment in how the rate of the color ink decreases toward the outer side of a color layer 13.

Figure 6:
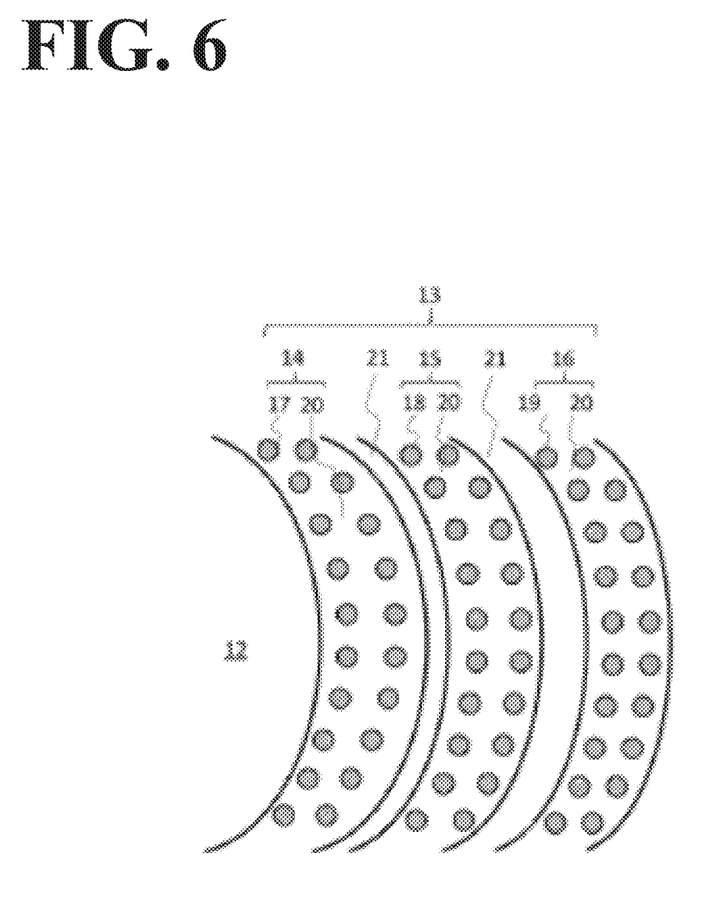
FIG. 6 is a partial cross-sectional view of a three-dimensional object according to a third embodiment.

FIG. 6 is a partial cross-sectional view of the three-dimensional object 10 according to the third embodiment. As illustrated in FIG. 6, the three-dimensional object 10 according to the third embodiment includes a color layer 13 including first layer 14 to third layer 16 respectively including a plurality of dots 17 to 19 of color ink. Clear ink 20 fills the space between the dots 17 to 19 of color ink. The dots 17 to 19 of color ink, respectively in the first layer 14 to third layer 16, have the same size and density. Layers 21, made of clear ink, is provided between the first layer 14 and the second layer 15 and between the second layer 15 and the third layer 16. One of the layers 21, made of clear ink, on the outer side is thicker than the other one. Specifically, the clear ink layer 21 provided between the second layer 15 and the third layer 16 is thicker than the clear ink layer 21 provide between the first layer 14 and the second layer 15.

The clear ink layers 21 thus configured enables the rate of the color ink decreasing toward the outer side in the color layer 13, in the configuration featuring the dots 17 to 19 of color ink, respectively in the first layer 14 to third layer 16, having the same size and density.

Logically, the rate of the clear ink 20 increases toward the outer side in the configuration where the rate of the color ink decreasing toward the outer side. This ensures the improved granular texture of the surface of the three-dimensional object 10, as in the three-dimensional object 10 according to the first embodiment.

This configuration, featuring a larger rate of the clear ink 20 on the outer side of the color layer 13 and a larger rate of the color ink on the inner side of the color ink 13, ensures that color loss is less likely to occur when the surface of the three-dimensional object 10 is scraped.

Fourth Embodiment

Next, a three-dimensional object 10 according to a fourth embodiment of the present disclosure is described. The three-dimensional object 10 according to the fourth embodiment has the same basic configuration as the three-dimensional object 10 according to the first embodiment (see FIG. 1 and FIG. 2).

Figure 7A:
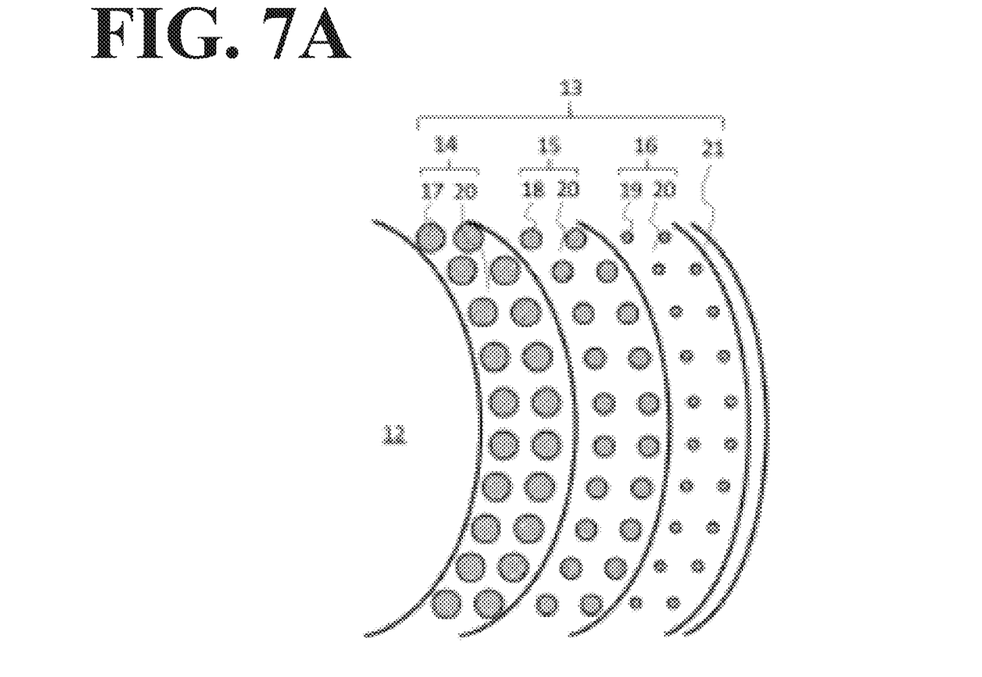
FIG. 7A is a partial cross-sectional view of a three-dimensional object according to a fourth embodiment.

FIG. 7A is a partial cross-sectional view of the three-dimensional object 10 according to the fourth embodiment. As illustrated in FIG. 7A, the three-dimensional object 10 according to the fourth embodiment features a clear ink layer 21 provided as the outermost layer of the color layer 13, in addition to the configuration according to the first embodiment. The clear ink layer 21 thus provided as the outermost layer ensures diffusion of light, and thus ensures improved granular texture on the surface of the three-dimensional object 10. The color loss is less likely to occur when the clear ink layer 21 provided as the outermost layer.

Figure 7B:
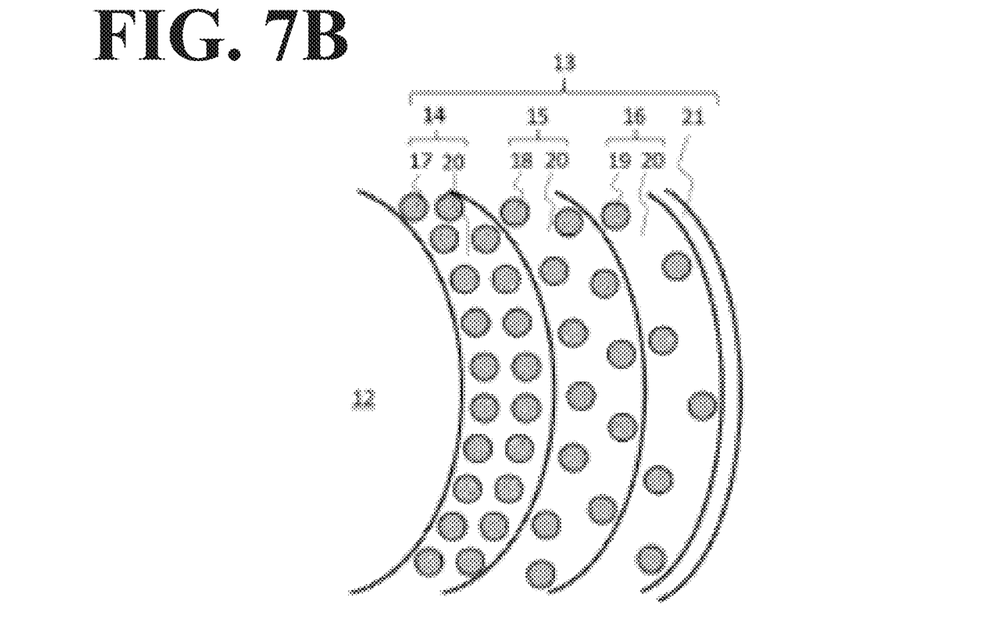
FIG. 7B is a partial cross-sectional view illustrating another example of the three-dimensional object according to the fourth embodiment.

The clear ink layer 21, provided as the outermost layer of the color layer 13 in the three-dimensional object 10 according to the first embodiment in the example illustrated in FIG. 7A, may also be provided as the outermost layer of the color layer 13 of any of the three-dimensional objects 10 according to the other embodiments described above. FIG. 7B illustrates an example where the clear ink layer 21 is provided as the outermost layer of the color layer 13 in the three-dimensional object 10 according to the second embodiment. This configuration also ensures improved granular texture on the surface of the three-dimensional object 10, and ensures that color loss is less likely to occur when the clear ink layer 21, provided as the outermost layer, is scraped.

In the example in the embodiments described above, the color layer 13 includes a plurality of layers. It is to be noted that the three-dimensional object 10 according to the present disclosure does not necessarily include layers with the same dot size and/or density.

Figure 8A:
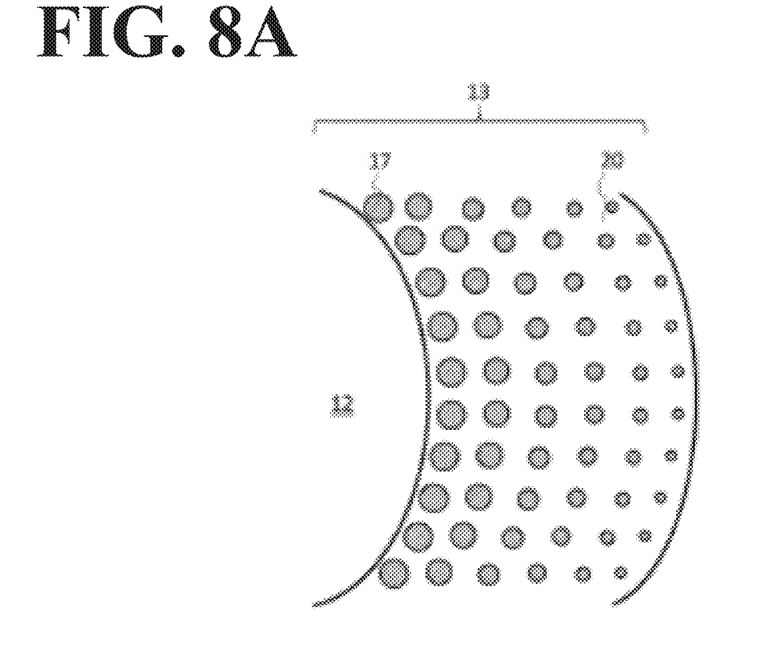
FIG. 8A is a diagram illustrating a configuration of a color layer with a size of dots of color ink decreasing toward an outer side and FIG. 8B is a diagram illustrating a configuration of a color layer with a density of the dots of color ink decreasing toward the outer side.
Figure 8B:
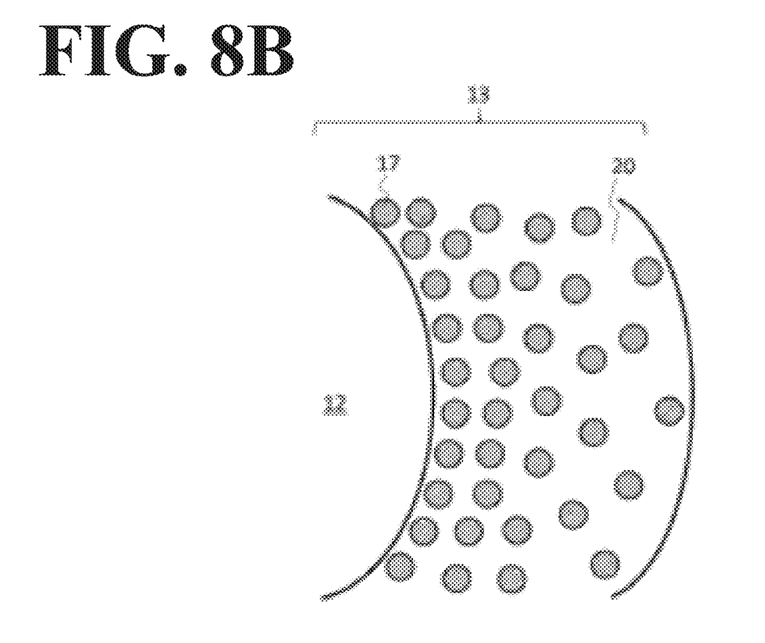

FIG. 8A illustrates a configuration of a color layer 13 including dots 17 of color ink with size decreasing toward the outer side. FIG. 8B illustrates a configuration of a color layer 13 with the density of dots of color ink decreasing toward the outer side. The color layer 13 that does not include a plurality of layers and has the rate of the color ink decreasing toward the outer side in the manner described above also ensures improved granular texture on the surface of the three-dimensional object 10 and that color loss is less likely to occur when the clear ink layer 21 provided as the outermost surface is scraped, as in the above-described embodiments.

Three-Dimensional Object Production Apparatus

Figure 9:
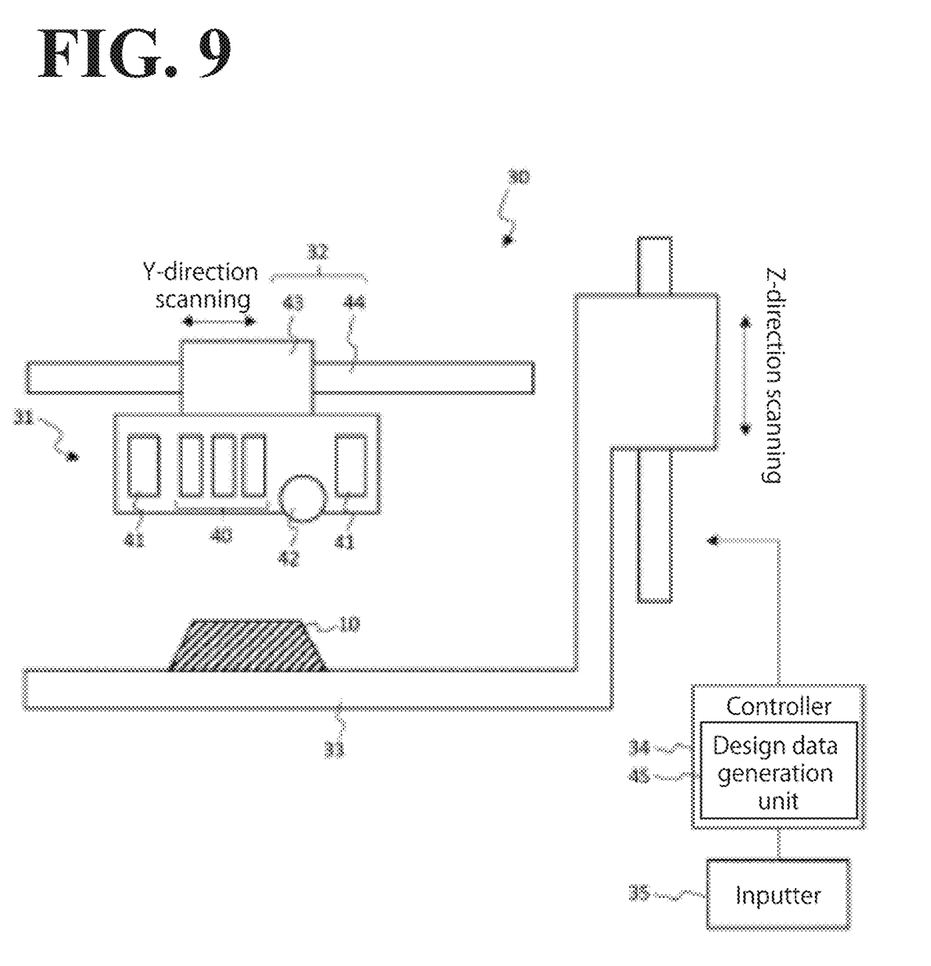
FIG. 9 is a diagram illustrating a three-dimensional object production apparatus.

Next, a configuration of a three-dimensional object production apparatus 30 for producing the three-dimensional object 10 according to the above-described embodiments is described. FIG. 9 illustrates a configuration of the three-dimensional object production apparatus 30. The three-dimensional object production apparatus 30 is a 3D printer utilizing ink-jet method including ejecting ultraviolet curable ink from an inkjet head, and depositing layers of the ink cured with ultraviolet light. The three-dimensional object production apparatus 30 includes an ejection unit 31, a main scanning driver 32, a platform 33, a controller 34, and an inputter 35. The ejection unit 31 ejects droplets (ink droplets) of build material of the three-dimensional object 10. The three-dimensional object production apparatus 30 is not limited to an apparatus utilizing the ultraviolet curable ink. Thus, layers of thermoset resin, ejected in a high temperature state from the inkjet head and cooled at a room temperature to be cured, may be deposited.

The ejection unit 31 includes ink heads 40, an ultraviolet light source 41, and a flattening roller 42. The ink head 40 ejects ink including color ink, colorless ink, and a supporting material. The ultraviolet light source 41 cures the ink thus ejected. The flattening roller 42 flattens a surface of a layer of curable resin formed in a process of forming the three-dimensional object 10. The number of the ink heads 40, which is three in the figure, may be appropriately set in accordance with the number of the types of ink to be used.

The ejection unit 31 ejects ink droplets of curable resin curable by being irradiated with ultraviolet light and causes the curable resin to cure so as to form layers constituting the three-dimensional object 10, for example. More specifically, the ejection unit 31 repeats a layer forming operation and a curing operation a plurality of times at a command from the controller 34, for example. The layer forming operation is to eject ink droplets to form a layer of the curable resin. The curing operation is to cause the layer of the curable resin formed in the layer forming operation to cure. The ejection unit 31 thus forms a plurality of layers of cured resin. The ejection unit 31 has a variable dot function and thus ink dots, hitting a printing medium, are adjustable to have various sizes.

The main scanning driver 32 causes the ejection unit 31 to perform a main scanning operation. As used herein, the main scanning operation refers to an operation to move in a main scanning direction set in advance (Y direction in the figure) and eject ink droplets.

The main scanning driver 32 includes a carriage 43 and a guide rail 44. The carriage 43 holds the ejection unit 31 with the ejection unit 31 facing the platform 33. That is, the carriage 43 holds the ejection unit 31 so that ink droplets are ejected in a direction toward the platform 33. In the main scanning operation, the carriage 43 holding the ejection unit 31 moves along the guide rail 44. The guide rail 44 guides the movement of the carriage 43 and, in the main scanning operation, allows the carriage 43 to move at a command from the controller 34.

It will be understood that the movement of the ejection unit 31 in the main scanning operation may be relative to the three-dimensional object 10. For example, it may be the three-dimensional object 10 that moves, which can be implemented by causing the platform 33 to move while keeping the position of the ejection unit 31 fixed.

The three-dimensional object 10 being formed is placed on the platform 33 as an example of a table. The platform 33 has a function to move its upper surface in vertical directions (Z direction in the figure) and, at a command from the controller 34, moves the upper surface according to progress of the formation of the three-dimensional object 10. This configuration enables the distance (gap) between the ejection unit 31 and the build surface of the three-dimensional object 10 being formed to be adjusted approximately. As used herein, the build surface of the three-dimensional object 10 refers to the last deposited layer of the three-dimensional object 10 that becomes the foundation upon which the next layer is formed by the ejection unit 31, for example. In Z-direction scanning, the platform 33 may be moved in vertical directions relative to the ejection unit 31 or the ejection unit 31 may be moved, for example.

The controller 34 is a non-limiting example of a central processing unit (CPU) in the three-dimensional object production apparatus 30, and controls the operation for forming the three-dimensional object 10 by controlling each unit of the three-dimensional object production apparatus 30 based on the shape information, color image information, or the like on the three-dimensional object 10 to be formed.

The controller 34 includes a design data generation unit 45 having a function of generating design data based on three-dimensional data, on the three-dimensional object 1030, input via the inputter 35. An operation for generating the design data is described later. The controller 34 controls the operation for forming the three-dimensional object 10 based on the design data generated.

It will be understood that the three-dimensional object production apparatus 30 may include any of various other configurations, other than the configuration illustrated in FIG. 9, necessary for formation, coloring, and/or other operations associated with the three-dimensional object 10, for example. For example, the three-dimensional object production apparatus 30 may further include a sub-scanning driver that causes the ejection unit 31 to perform a sub-scanning operation. As used herein, the sub-scanning operation refers to an operation to move, relative to the three-dimensional object 10 being formed, the ink-jet heads of the ejection unit 31 in a sub-scanning direction, which is approximately orthogonal to the main scanning direction. The sub-scanning driver causes the ejection unit 31 to perform the sub-scanning operation as necessary when, for example, the length in the sub-scanning direction of the three-dimensional object 10 to be formed is greater than the formable width of the ink-jet heads of the ejection unit 31. The sub-scanning driver may be a driver that causes the guide rail to move together with the carriage holding the ejection unit 31, for example.

[Method for Producing a Three-Dimensional Object]

Figure 10:
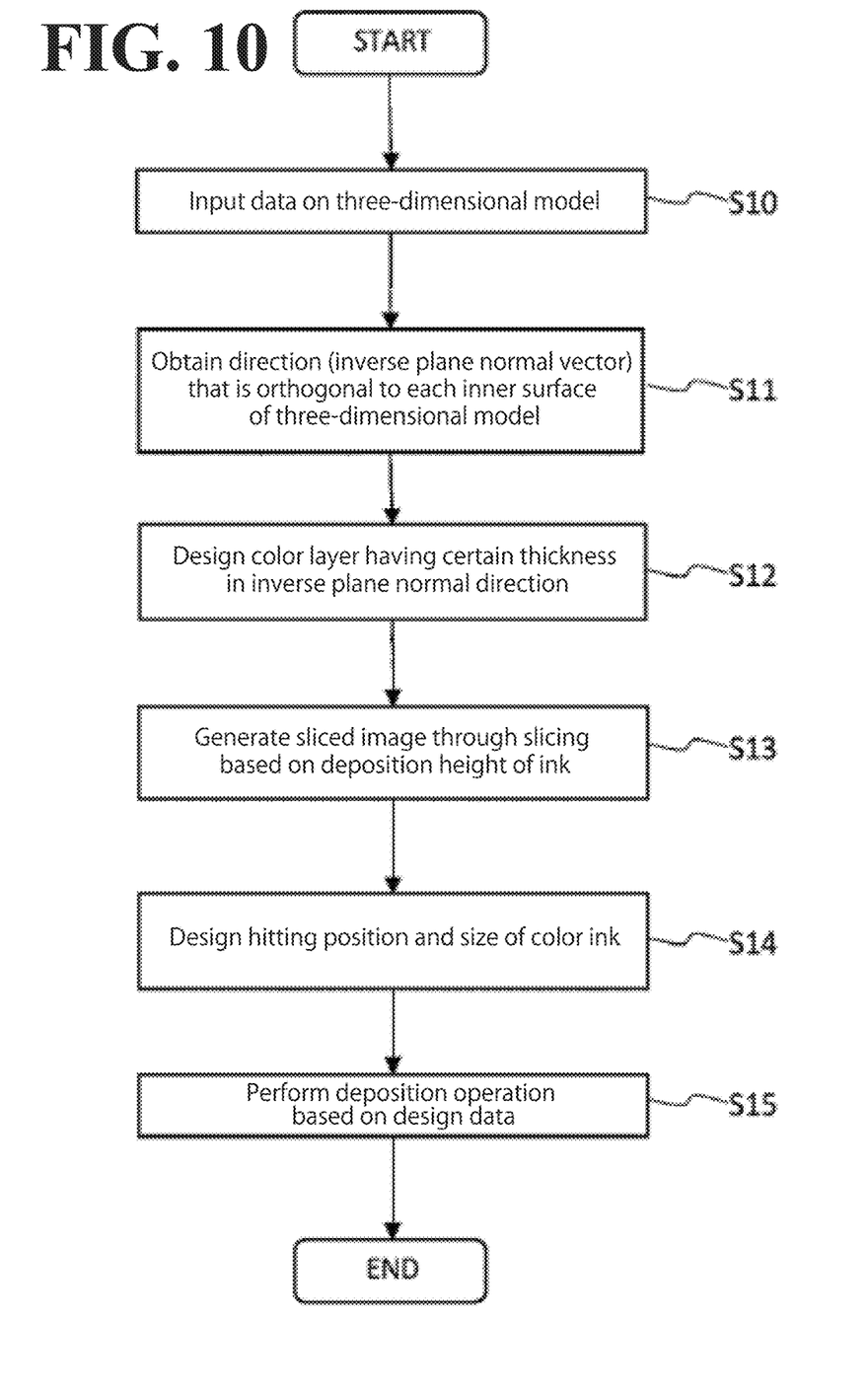
FIG. 10 is a flowchart illustrating operations in a method for producing a three-dimensional object.

FIG. 10 is a flowchart illustrating an operation for producing the three-dimensional object 10 with the three-dimensional object production apparatus 30. First of all, data on a three-dimensional model of the three-dimensional object 10 to be produced is input to the three-dimensional object production apparatus 30 (S10). Then, the design data is generated based on the data on the three-dimensional model.

FIG. 11 is a schematic view illustrating processes for generating the design data from the three-dimensional model. The design data generation unit 45 of the three-dimensional object production apparatus 30 obtains a direction (inverse plane normal vector) that is orthogonal to each inner surface of the three-dimensional model (S11). FIG. 11A illustrates the inverse plane normal vector obtained for each surface.

Figure 11A:
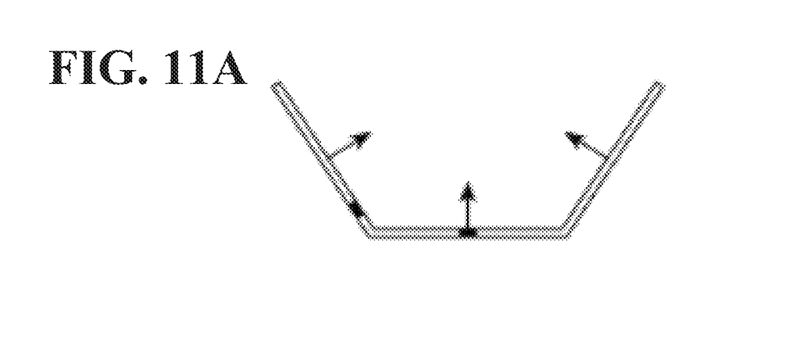
FIGS. 11A to 11D are schematic diagrams illustrating processes for generating a design data from a three-dimensional model.
Figure 11B:
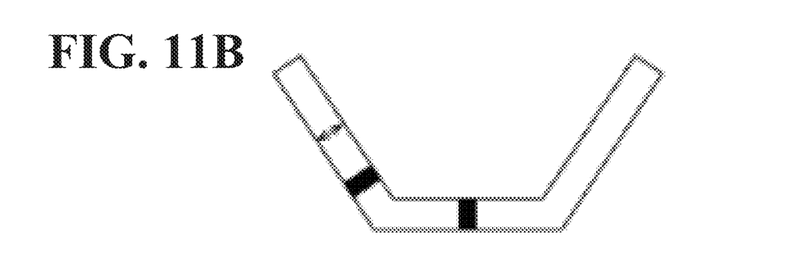

Then, the design data generation unit 45 designs the color layer 13 having a certain thickness in the inverse plane normal direction (S12). FIG. 11B illustrates an example of the color layer 13 designed with the surfaces as described above. This color layer 13 includes a plurality of layers, and the rate of the color ink is determined for each of the layers of the color layer 13. Although not elaborated in FIG. 10 and FIG. 11, the three-dimensional object 10 including the reflective layer 12 is designed to have the reflective layer 12 provided on the inner side of the color layer 13.

Figure 11C:
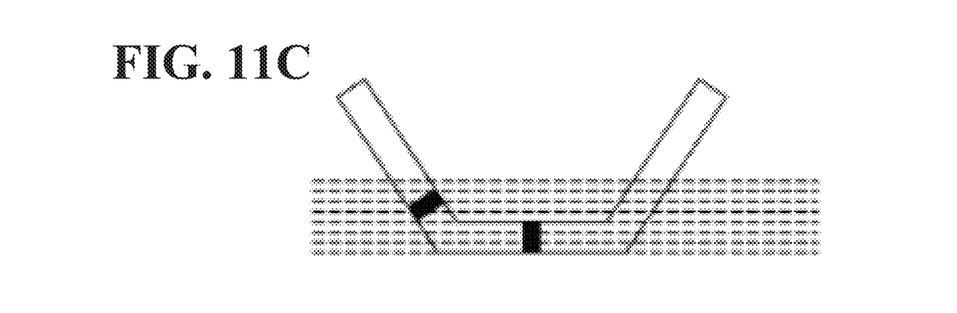
Figure 11D:
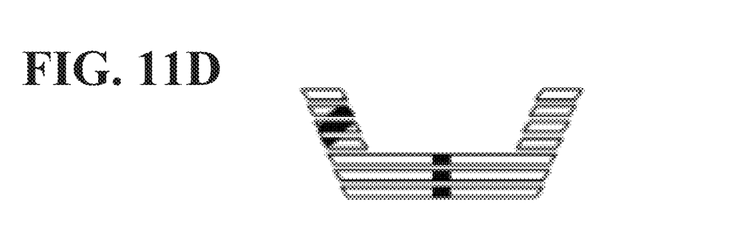

Then, the design data generation unit 45 slices the three-dimensional model, with the color layer 13 thus designed, based on a deposition height of ink to generate a sliced image of each layer (S13). The deposition height represents the height of a single layer formed by curing the color ink and clear ink, ejected during a single scanning operation performed with the ejection unit 31, with ultraviolet light. FIG. 11C illustrates layers for slicing the three-dimensional model. FIG. 11D illustrates an example of a sliced image obtained by the slicing.

Next, the design data generation unit 45 uses error diffusion, ordered dithering, or the like to convert the color layer 13 into ink information for a printer, and determines a hitting position and a dot size of color ink in the color layer 13 (S14). The color layer 13 includes a plurality of layers and the rate of the color ink is determined for each layer. Thus, the size and the dot size of the color ink are designed based on the rate of the color ink. The three-dimensional object production apparatus 30 performs a deposition operation based on the design data thus generated (S15).

The color layer 13 is deposited by the three-dimensional object production apparatus 30 with the color ink hit on a designed position and cured with ultraviolet light. Then, a sufficient amount of the clear ink is provided in the space between the dots of color ink, with an excess amount of the clear ink scraped off by the flattening roller 42. Then, the clear ink filling the space between the dots of color ink is cured with ultraviolet light.

The dot size decreases toward the outer side when the color layer 13 according to the first embodiment is formed, but may also increase toward the outer side because the ejection unit 31 has the variable dot function. The color layer 13 according to the second embodiment is formed with the design data generation unit 45 generating the design data with the color ink hitting positions designed in such a manner that the dot density decreases toward the outer side. This ensures that the dot density is appropriately controlled with the color ink ejected based on the design data.

While the three-dimensional object, the three-dimensional object production apparatus, and the method for producing a three-dimensional object according to the embodiment of the present disclosure are described above, the present disclosure is not limited to the above-described embodiments. In the three-dimensional object according to the present disclosure, the rate of color ink may decrease toward the outer side with both of the size and the dot density of the color ink controlled.

Advantageous Effects of the Embodiments (1) A three-dimensional object 10 according to any one of the first to fourth embodiments is made of ultraviolet curable ink and includes a color layer 13 serving as an outer surface. The color layer 13 includes color ink and clear ink 20 filling a space between dots of the color ink. A rate of the color ink to the clear ink decreases toward an outer side. With this configuration, the clear ink 20 ensures diffusion of light beams reflected by dots 17 to 19 of color ink in a portion close to the outer side of the color layer 13. This ensures improved granular texture on the surface of the three-dimensional object 10.

(2) The three-dimensional object 10 according to any one of the first to fourth embodiments may further include a reflective layer that reflects light, the reflective layer being provided more on an inner side than the color layer 13. This configuration enables that the color of the color layer 13 is not mixed with the color of an undelaying model material 11, and thus enables a desired color to be faithfully provided.

(3) In the three-dimensional object 10 according to the first embodiment, the color layer 13 may be formed with a size of the dots 17 to 19 of color ink decreasing toward the outer side. This configuration enables the rate of the color ink to the clear ink 20 to be decreased.

(4) in the three-dimensional object 10 according to the first embodiment, the color layer 13 may include a plurality of layers 14 to 16, and the size of the dots of color ink may be uniform in each of the layers 14 to 16. This configuration enables the size of the dots 17 to 19 of color ink to be set for each of the layers 14 to 16.

(5) In the three-dimensional object 10 according to the second embodiment, the color layer 13 may be formed with a density of the dots 17 to 19 of color ink decreasing toward the outer side. This configuration enables the rate of the color ink to the clear ink 20 to be decreased.

(6) in the three-dimensional object 10 according to the second embodiment, the color layer 13 may include a plurality of layers 14 to 16, and the density of the dots of color ink may be uniform in each of the layer 14 to 16. This configuration enables the density of the dots 17 to 19 of color ink to be set for each of the layers 14 to 16.

(7) In the three-dimensional object 10 according to a modification of the first embodiment or a modification of the second embodiment, a layer 21 made of clear ink may be provided between the plurality of layers 14 to 16 of the color layer 13. This configuration enables diffusion of light beams from the color layer 13 provided more on the inner side than the layer 21 made of clear ink, and thus ensures improved granular texture.

(8) In the three-dimensional object 10 according to the third embodiment, the color layer 13 may include a plurality of layers with layers 21 made of clear ink each provided between adjacent ones of the plurality of layers 14 to 16, and the layers 21 made of the clear ink may be provided in such a manner that a layer on the outer side has a larger thickness than a layer on the inner side. The layers 21 made of clear ink ensures that the rate of the color ink decreases toward the outer side even when the layers of the color layer 13 have a uniform configuration.

(9) In the three-dimensional object 10 according to the fourth embodiment, the color layer 13 may include a layer 21 made of clear ink serving as an outermost surface. The clear ink layer 21, serving as the outermost layer, ensures diffusion of light beams from the color ink in the color layer 13, and thus ensures improved granular texture.

(10) A method for producing a three-dimensional object 10 according to an embodiment through additive manufacturing using curable ink includes forming a color layer 13 having a certain thickness at a portion more on an inner side than a surface of the three-dimensional object 10, based on three-dimensional data on the three-dimensional object 10, generating a sliced image serving as design data on each layer by slicing the three-dimensional data on the three-dimensional object 10 based on a deposition size of the curable ink, setting an amount of color ink forming the color layer 13, in the sliced image, in such a manner that a rate of the color ink to clear ink decreases toward an outer side, and depositing a layer of the curable ink based on data on the sliced image.

This method enables the color layer 13 to be designed to have the rate of the color ink to the clear ink 20 decreasing toward the outer side based on the three-dimensional data on the three-dimensional object 10, and the color layer 13 to be generated based on such design data. With this configuration, the clear ink ensures diffusion of light beams reflected by the dots of color ink in a portion close to the outer side of the color layer 13. This ensures improved granular texture on the surface of the three-dimensional object 10.

(11) In the method for producing a three-dimensional object according to the embodiment, the depositing may include adjusting a size of dots 17 to 19 of color ink in accordance with the amount of the color ink forming the color layer 13. This configuration enables the rate of the color ink to the clear ink 20 to be decreased.

(12) In the method for producing a three-dimensional object according to the embodiment, the depositing may include adjusting a density of dots 17 to 19 of color ink in accordance with the amount of the color ink forming the color layer 13. This configuration enables the rate of the color ink to the clear ink 20 to be decreased.

(13) A three-dimensional object production apparatus 30 according to an embodiment forms a three-dimensional object 10 through additive manufacturing using curable ink and includes an inputter 35 configured to receive three-dimensional data on the three-dimensional object 10, a design data generation unit 45 configured to generate design data on each layer, based on the three-dimensional data received by the inputter 35, and a depositing unit including an ejection unit 31, a main scanning driver 32, a platform 33, and the like and configured to deposit layers based on the design data. The design data generation unit 45 is configured to execute forming a color layer 13 having a certain thickness at a portion more on an inner side than a surface of the three-dimensional object 10, based on the three-dimensional data on the three-dimensional object 10, generating a sliced image serving as design data on each layer by slicing the three-dimensional data on the three-dimensional object 10 based on a deposition size of the curable ink, and setting an amount of color ink forming the color layer 13, in the sliced image, in such a manner that a rate of the color ink to clear ink decreases toward an outer side.

This configuration enables the color layer 13 to be designed to have the rate of the color ink to the clear ink 20 decreasing toward the outer side based on the three-dimensional data on the three-dimensional object 10, and the color layer 13 to be generated based on such design data. With this configuration, the clear ink 20 ensures diffusion of light beams reflected by dots 17 to 19 of color ink in a portion close to the outer side of the color layer 13. This ensures improved granular texture on the surface of the three-dimensional object 10.

(14) in the three-dimensional object production apparatus 30 according to the embodiment, the depositing unit may be configured to adjust a size of dots 17 to 19 of color ink in accordance with the amount of the color ink forming the color layer 13. This configuration enables the rate of the color ink to the clear ink 20 to be decreased.

(15) In the three-dimensional object production apparatus 30 according to the embodiment, the depositing unit may be configured to adjust a density of dots 17 to 19 of color ink in accordance with the amount of the color ink forming the color layer 13. This configuration enables the rate of the color ink to the clear ink 20 to be decreased.

The present disclosure is suitable for a method for producing a colored three-dimensional object with a 3D printer or the like.

10 three-dimensional object
11 model material
12 reflective layer
13 color layer
14 first layer
15 second layer
16 third layer
17 to 19 dots of color ink
20 clear ink
21 clear ink layer
30 three-dimensional object production apparatus
31 ejection unit
32 main scanning driver
33 platform
34 controller
35 inputter
40 ink head
41 ultraviolet light source
42 flattening roller
43 carriage
44 guide rail
45 design data generation unit

What is claimed is:

1. A three-dimensional object made of curable ink, the three-dimensional object comprising a color layer serving as an outer surface,
wherein the color layer comprises color ink dots and clear ink filling a space between the color ink dots, and
wherein a rate of the color ink dots in the color layer to the clear ink in the color layer decreases toward an outer side.

2. The three-dimensional object according to claim 1, further comprising a reflective layer that reflects light, the reflective layer being provided more on an inner side than the color layer.

3. The three-dimensional object according to claim 1, wherein the color layer is formed with a size of the color ink dots decreasing toward the outer side.

4. The three-dimensional object according to claim 3,
wherein the color layer comprises a plurality of layers from the outer side to an inner side, and
wherein the size of the color ink dots is uniform in each of the layers.

5. The three-dimensional object according to claim 1, wherein the color layer is formed with a density of the color ink dots decreasing toward the outer side.

6. The three-dimensional object according to claim 5, wherein the color layer comprises a plurality of layers from the outer side to an inner side, and wherein the density of the color ink dots is uniform in each of the layers.

7. The three-dimensional object according to claim 4, wherein a layer made of clear ink is provided between the plurality of layers of the color layer.

8. The three-dimensional object according to claim 1,
wherein the color layer comprises a plurality of layers with layers made of clear ink each provided between adjacent ones of the plurality of layers, and
wherein the layers made of the clear ink are provided in such a manner that a layer on the outer side has a larger thickness than a layer on the inner side.

9. The three-dimensional object according to claim 1, wherein the color layer comprises a layer made of clear ink serving as an outermost surface.

10. A method for producing a three-dimensional object through additive manufacturing using curable ink, the method comprising:
forming a color layer having a certain thickness at a portion more on an inner side than an outer side of the three-dimensional object, based on three-dimensional data on the three-dimensional object;
generating a sliced image serving as design data on each layer by slicing the three-dimensional data on the three-dimensional object based on a deposition size of the curable ink;
setting an amount of color ink dots forming the color layer, in the sliced image, in such a manner that a rate of the color ink dots in the color layer to clear ink in the color layer decreases toward the outer side; and
depositing a layer of the curable ink based on data on the sliced image.

11. The method for producing a three-dimensional object according to claim 10, wherein the depositing comprises adjusting a size of the color ink dots in accordance with the amount of the color ink dots forming the color layer.

12. The method for producing a three-dimensional object according to claim 10, wherein the depositing comprises adjusting a density of the color ink dots in accordance with the amount of the color ink dots forming the color layer.

13. A three-dimensional object production apparatus that forms a three-dimensional object through additive manufacturing using curable ink, the apparatus comprising:
an inputter configured to receive three-dimensional data on the three-dimensional object;
a design data generation unit configured to generate design data on each layer, based on the three-dimensional data received by the inputter; and
a depositing unit configured to deposit layers based on the design data, wherein the design data generation unit is configured to execute:

forming a color layer having a certain thickness at a portion more on an inner side than an outer side of the three-dimensional object, based on the three-dimensional data on the three-dimensional object;

generating a sliced image serving as design data on each layer by slicing the three-dimensional data on the three-dimensional object based on a deposition size of the curable ink; and setting an amount of color ink dots forming the color layer, in the sliced image, in such a manner that a rate of the color ink dots in the color layer to clear ink in the color layer decreases toward the outer side.

14. The three-dimensional object production apparatus according to claim 13, wherein the depositing unit is configured to adjust a size of the color ink dots in accordance with the amount of the color ink dots forming the color layer.

15. The three-dimensional object production apparatus according to claim 13, wherein the depositing unit is configured to adjust a density of the color ink dots in accordance with the amount of the color ink dots forming the color layer.

16. The three-dimensional object according to claim 2, wherein the color layer is formed with a size of the color ink dots decreasing toward the outer side.

17. The three-dimensional object according to claim 2, wherein the color layer is formed with a density of the color ink dots decreasing toward the outer side.

18. The three-dimensional object according to claim 3, wherein the color layer is formed with a density of the color ink dots decreasing toward the outer side.

19. The three-dimensional object according to claim 5, wherein a layer made of clear ink is provided between the plurality of layers of the color layer.

20. The three-dimensional object according to claim 6, wherein a layer made of clear ink is provided between the plurality of layers of the color layer.

* * * * *